Nov. 4, 1958 A. B. OLSON 2,859,359

MAGNETIC BINARY COUNTING CIRCUIT

Filed Jan. 31, 1956 4 Sheets-Sheet 1

INVENTOR

ARTHUR B. OLSON

BY Cushman, Darby & Cushman

ATTORNEYS

INVENTOR
ARTHUR B. OLSON
BY Cushman, Darby & Cushman
ATTORNEYS

INVENTOR
ARTHUR B. OLSON

BY Cushman, Darby & Cushman
ATTORNEYS

MAGNETIC BINARY COUNTING CIRCUIT

Filed Jan. 31, 1956 4 Sheets-Sheet 4

INVENTOR
ARTHUR B. OLSON
BY Cushman, Darby & Cushman
ATTORNEYS

United States Patent Office 2,859,359

Patented Nov. 4, 1958

2,859,359

MAGNETIC BINARY COUNTING CIRCUIT

Arthur B. Olson, Richfield, Minn., assignor to Sperry Rand Corporation, New York, N. Y., a corporation of Delaware Application January 31, 1956, Serial No. 562,460

37 Claims. (Cl. 307—88)

This invention relates to circuits utilizing magnetic cores preferably of the square loop type.

In greater detail, the invention pertains to binary counting circuits employing magnetic cores, and the invention also pertains to basic circuit components which make up binary counting circuit units and counting chains thereof.

One object of the present invention is to provide a magnetic binary counting circuit.

A further object of this invention is to provide forms of transfer circuitry for transferring information from one core to another.

A further object of the invention relates to providing transfer of information from one core to another, or among three or more cores, by transfer techniques according to the invention while preventing the shifting of a given core from affecting the status of the other cores.

A further object of the invention is to provide a transfer circuit for transferring information from one core to two or more other cores so that first one of said other cores is shifted in state, and then another of the other cores is shifted in state.

A further object of this invention is to provide interconnection of counter units according to the foregoing objects into counter chains.

Further objects and the entire scope of the invention will be in part expressed and in part obvious in the following detailed description of illustrative embodiments of the invention, and in the appended claims.

The various features of the invention may be further understood by reference to the accompanying drawings, wherein.

Figures 1, 1A, 2, 2A, 5:
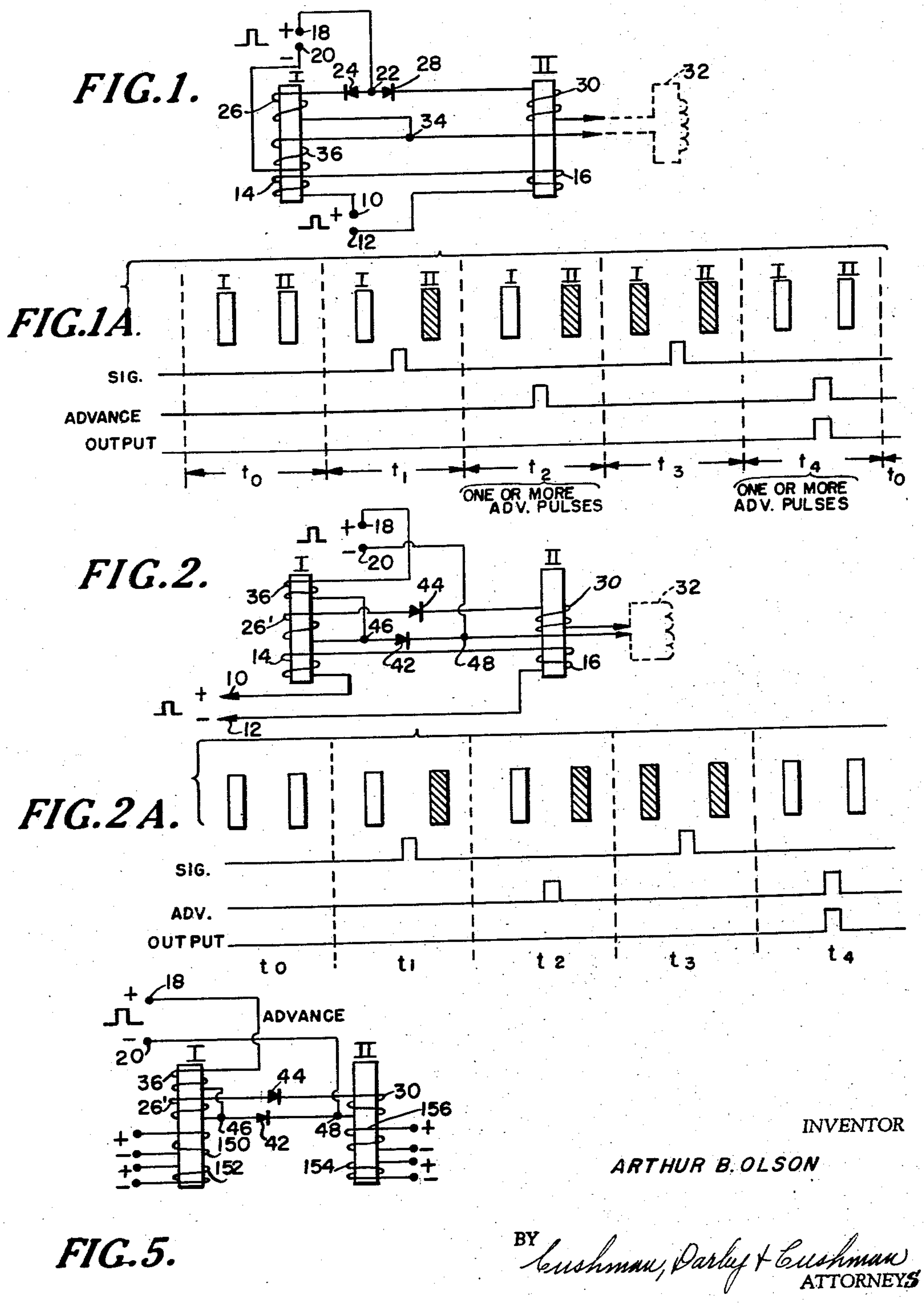
Figure 1 shows a first embodiment of a counting circuit unit according to the invention, and shows component transfer circuits employed therein.
Figure 1A is a chart of waveforms and flux status pertinent to the operation of the circuit of Figure 1.
Figure 2 shows a second embodiment of counting circuit units and transfer circuits.
Figure 2A is a chart of waveforms and flux status pertinent to the operation of the circuit of Figure 2.
Figure 5 shows an arrangement of a transfer circuit and core setting and resetting circuits according to a feature of the invention.

Referring to Figure 1, two magnetic cores I and II are diagrammatically illustrated. Only straight bars are shown in Figure 1 (and other figures of this application) but it will be understood that preferably the magnetic circuit is closed by having the cores of toroidal, rectangular or other shape. It may be further mentioned that, as will be well understood, the magnetic material of each core preferably is the substantially "square loop" type.

In Figure 1 is a signal input circuit exists between terminals 10 and 12. The signal input circuit extends from terminal 10 through winding 14 on core I and then through winding 16 on core II, windings 14 and 16 being shown in series. The arrangement of Figure 1 further includes a circuit extending between terminals 18 and 20. This circuit extends from terminal 18 to junction 22 whereat the circuit divides into two branches. Junction 22 marks the beginning of what will be termed a transfer circuit. A first branch includes a uni-directional conducting device 24 and a winding 26 on core I. The other branch includes a second uni-directional conducting device 28, a winding 30 on core II and a winding 32 at a next following counter unit or stage (not shown). The circuit branches recombine at junction 34. Past junction 34 exists what may be termed an advance circuit, which includes a winding 36 on core I. The main circuit then is returned to terminal 20.

In Figure 1 in accordance with the present invention the signal input circuit extending between terminals 10 and 12 is to be arranged in relation to the nature of the cores and the amplitude of an input pulse across terminals 10 and 12, to first shift one of the cores, say core II, and then subsequently to be able to shift the remaining core, say core I. No limitation to two cores is required, as will be apparent. Such operation can be achieved for example by providing winding 16 with a considerably greater number of turns than winding 14, or the coupling between the respective windings and their cores can be adjusted. Other equivalent techniques will occur to those skilled in the art upon understanding of the complete invention, and no limitation is intended.

Let it be supposed for present analysis that winding 16 has twice as many turns as winding 14. Under these circumstances, if a signal input pulse positive at terminal 10 and negative at terminal 12, and within a predetermined amplitude range, is applied to the signal circuit, and assuming initially that both cores I and II are in a "cleared" condition, current flowing from terminal 10 toward terminal 12 will generate a sufficient M. M. F. at winding 16 to shift core II to a "set" condition. This step assumes that the clear condition had the remnant flux in such a direction that current flowing through winding 16 is in a direction making possible a shift in the state of the core. While core II has shifted, the insufficient number of turns in winding 14, or other devices, has reduced the effective M. M. F. applied to core I, so that core I could not shift into its "set" state. It will be apparent that the signal input circuit as viewed towards terminals 10 and 12 initially finds a relatively high impedance due to the fact that the current through windings 14 and 16 faces the task of shifting the cores. Thus, with a given voltage amplitude of pulse across terminals 10 and 12, a relatively limited current flows.

Continuing to refer to Figure 1 and to windings 14 and 16 thereon, if it now be assumed that core II is shifted to its set condition, a second signal input pulse will now find a relativley high impedance only at core I, while at core II the impedance will be greatly reduced since that core has now been shifted. Accordingly, notwithstanding the relatively few number of turns at winding 14 (or other coupling effect to core I) sufficient current will now flow through windings 14 and 16 to also shift core I. It will be observed that following the application of two input signals, both cores have been shifted.

Continuing to refer to Figure 1, and now disregarding for the moment windings 14 and 16, the remaining windings and circuitry are to be explained as follows: It is intended that in response to an advance pulse applied to terminals 18 and 20, positive at 18 and negative at 20, current is to invariably flow through winding 36 on core I in amount sufficient to positively shift core I if its state is such as to make shifting possible. However, whether core I is shifted by the advance pulse, or is not shifted, creates a different situation in the respective branch circuits. In the case where an advance current is not shifting core I, litle impedance is presented at winding 26, and a relatively great amount of the advance current will flow through diode 24 and winding 26 to junction 34. The branch including diode 28, winding 30 and winding 32, is to be of such nature impedance-wise that the residual current flowing through this branch if core I is not shifted, is to be incapable of shifting core II, even if shiftable. This can be achieved for example by having a greater number of turns in winding 26 than in winding 30, and/or having a greater forward impedance at diode 28 than at diode 24, or adding resistance. No particular limitation to the illustrated circuit is intended. In the other case, where the advance current through winding 36 is shifting core I, a considerable back E. M. F. will be generated in winding 26, or, it can be said that winding 26 presents a much greater impedance to current flow through diode 24. In this situation, a relatively great amount of current is diverted through diode 28 and through winding 30. In this case, the current through winding 30 is to be sufficient in relation to the number of turns in winding 30, to shift core II, if shiftable.

The diodes 24 and 28 are not basically required in all cases. However, a further feature of importance in Figure 1 is to be attributed to the unidirectional conducting devices or diodes 24 and 28. Attention is drawn to the fact that these devices are "back-to-back" in the loop circuit which includes the windings 26, 30 and 32. The incorporation of these back-to-back uni-directional conducting devices in the loop circuit precludes a shifting operation upon one of the cores, as by windings 14 or 16, from affecting the other cores.

Additionally referring to Figure 1A, it may be understood how the circuitry of Figure 1 provides a unique binary counting circuit. In Figures 1A the uppermost part symbolically represents the pair of cores I and II, repeated in time periods $t_0$, $t_1$, $t_2$, $t_3$ and $t_4$. Exemplary occurrences of signal pulses in $t_1$ and $t_3$ are shown below the representations of the cores. Below the signal waveform is a waveform showing the time occurrence of advance pulses. There is also a waveform showing the occurrence of an output pulse, as in winding 32 of Figure 1. Time period $t_0$ suggests that cores I and II are both cleared. The occurrence of a signal pulse in time period $t_1$ will shift core II to a set position. In Figure 1A a set condition is illustrated by cross-hatching on the core. In time period $t_2$ any number of advance pulses can occur, but the situation of the cores will not be changed. In time period $t_3$ the occurrence of a second signal pulse will shift core I to its set position. In time period $t_4$ one or more advance pulses occur. The first one of these advance pulses will shift both cores I and II back to their cleared condition. At this time, an output pulse is produced. It will thus be observed that the function of a binary counting circuit has been carried out. That is, an output pulse is produced only once for every two input pulses. Moreover, it will be observed that there is no requirement for a strict interlace of signal and advance pulses. There may be any number of advance pulses intervening between signal pulses, without adverse effect on the circuit.

An alternative embodiment of the counting circuit and parts thereof is shown in Figure 2. In this figure the same reference characters are employed for analogous parts, wherefor terminals 10, 12 and 18, 20 and windings 14, 16, 30, 32 and 36 will be immediately observed. A winding analogous to winding 26 of Figure 1 is now designated 26'. Two unidirectional conducting devices or diodes are provided, but these are arranged somewhat differently, and are therefore now designated by reference characters 42 and 44.

In Figure 2 the signal pulse circuit remains the same. There is a change in the advance and transfer circuits to the extent that at a junction 46 the transfer circuit divides between two branches: the first includes winding 26' diode 44, winding 30 and winding 32. The other branch includes diode 42. The branches recombine at junction 48 and return to terminal 20. In operation, when core I is not shifting due to current through winding 36, most of the advance current will flow directly between junctions 46 and 48 through diode 42, and insufficient current will pass through the other circuit branch including winding 30 to shift core II. However, should core I be shifting during an advance pulse, then the E. M. F. generated in winding 26' by transformer action will drive sufficient current through winding 30 to shift core II. An output pulse will be generated simultaneously at winding 32. The relative forward impedances of diodes 42 and 44, the inherent resistances of the circuit branches, and/or the relative number of turns at windings 26' and 30 may be adjusted to carry out the intended function, all as will be understood upon having the foregoing understanding of the basic arrangement.

Referring to Figure 2A in addition to Figure 2, and being mindful of the explanation of Figure 1A, the first signal input pulse will shift core II. One or more successive advance pulses will have no effect. The next signal input pulse will shift core I. The next following advance pulse will clear both cores I and II, and an output pulse will be concurrently generated.

Figures 3, 3A, 3B, 3D:
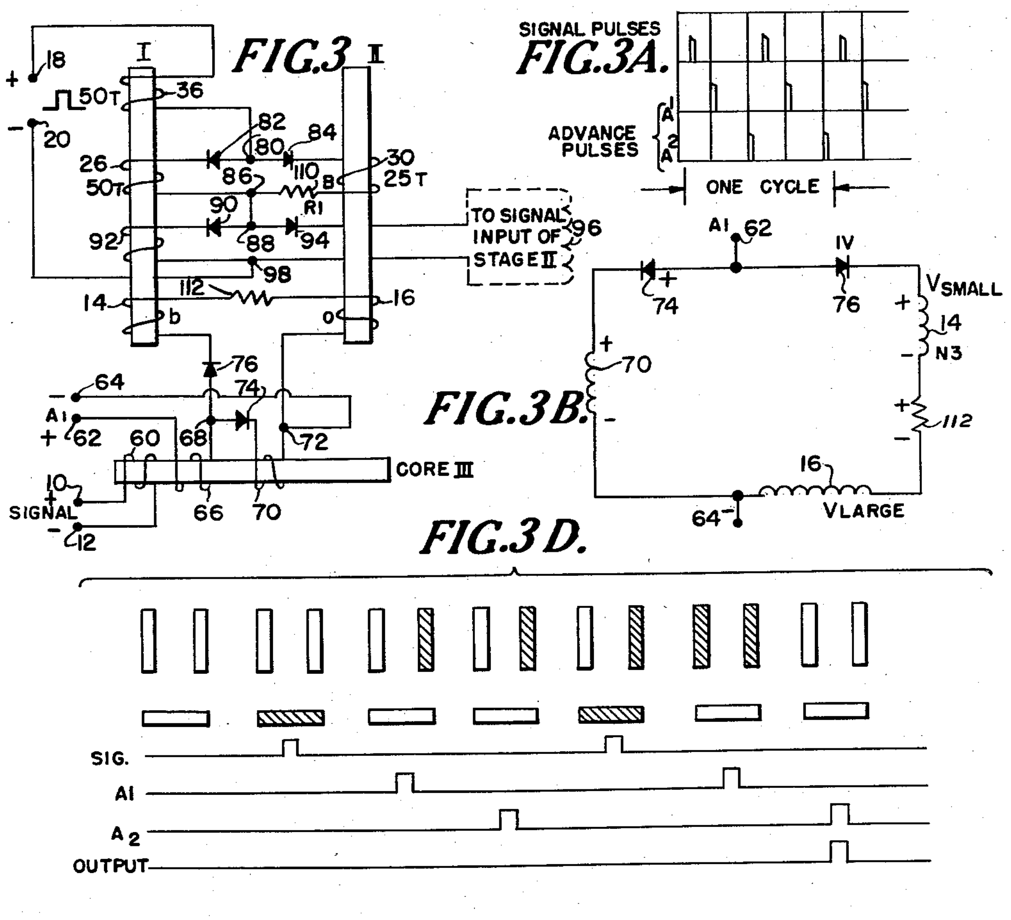
Figure 3 shows still a further embodiment of a counter unit and component circuitry according to the invention.
Figure 3A is a chart of waveforms pertinent to the operation of the circuitry of Figure 3.
Figure 3B is an equivalent circuit diagram pertinent to the embodiment of Figure 3.
Figure 3D is a chart of waveforms related to flux status of the cores in the operation of the Figure 3 embodiment.

Figure 3 shows a further development of the basic invention, mainly by utilization of a third core III. In Figure 3 the same reference characters are used insofar as possible and analogy will be most readily seen to Figure 1, noting in Figure 3 terminals 18, 20, advance circuit winding 36 and transfer windings 26 and 30. Windings 14 and 16 in the signal input circuit are also to be observed. The purpose of core III in Figure 3 is to provide a signal source of the proper impedance and with enough output voltage to drive cores I and II one at a time. As will be understood by those familiar with the digital computer art, it will be frequently necessary to so provide proper impedance and output voltage in at least the first stage of a counter chain.

The circuit of Figure 3 lends itself to operation in a system where two sets of advance pulses, $A_1$ and $A_2$, are available in interlaced sequence, these advance pulses also occurring just ahead of possible signal pulses. Figure 3A shows a representative array of signal pulses and $A_1$ and $A_2$ advance pulses within one cycle of operation.

The additional components shown in Figure 3 may be understood by the following explanation: the signal pulses at terminals 10 and 12 are passed through a winding 60 on core III so as to be able to shift the core to a "set" condition. $A_1$ advance pulses are to be applied to terminals 62 and 64, positive at 62. The $A_1$ advance circuit extends through winding 66 on core III and then to junction 68 whereat a transfer circuit divides into two branches, one proceeding through winding 70 on core III and to junction 72. The other circuit branch extends through windings 14 and 16 in series and to junction 72. The circuit branch including winding 70 preferably includes a uni-directional conducting device or diode 74, while the other circuit branch includes a similar device 76. These devices are back-to-back in the loop circuit including windings 14, 16 and 70. The circuit is returned from junction 72 to terminal 64. The design aim of the circuit, in keeping with the explanation hereinabove of Figure 1 particularly, is that when core III is shifting the back E. M. F. or impedance at winding 70 will divert sufficient current through windings 14 and 16 to shift at least core II, and when core II has been shifted to a set condition, to shift core I. When core III is not shifting, insufficient current passes through windings 14 and 16 to shift either one in either case.

The circuit of Figure 3 extends from the $A_2$ positive terminal 18 through advance winding 36 to junction 80, whereat a transfer circuit divides into two branches, one of which includes the winding 26 and uni-directional conducting device 82. The other branch includes winding 30 and uni-directional conducting device 84. The branches recombine at terminal 86 and connection is made to a further junction 88. Again the circuit divides into two branches, one of which includes a uni-directional conducting device 90 and a winding 92 on core I. The other circuit branch includes uni-directional conducting device 94 and a signal input winding 96 in the next stage. The circuit branches recombine at junction 98 and the circuit returned to the $A_2$ negative terminal 20.

As shown in Figure 3, a resistor 110 may be included in the circuit branch with winding 30, and a resistor 112 may be included in the circuit branch with windings 14 and 16. These resistors may be added to aid in the control of relative currents, as more generally explained hereinabove.

Figure 3C:
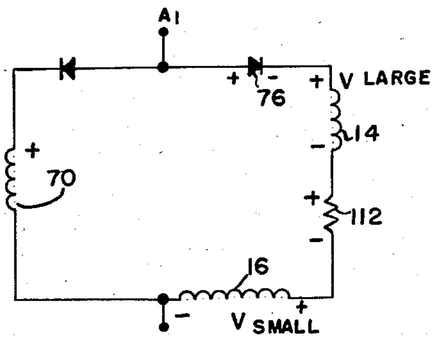
Figure 3C is a further equivalent circuit pertinent to the Figure 3 embodiment in another stage of its operation.

Figures 3B and 3C are provided to aid in an understanding of the circuit operation. Figure 3D is also provided, showing symbolic representation of the state of the cores in relation to the time occurrence of signal pulses, $A_1$ advance pulses, $A_2$ advance pulses, and output pulses.

To analyze a cycle of operation of the circuit of Figure 3, let it be assumed that initially each of cores I, II and III is in a 0 or cleared state. In Figure 3D, this is the state where the core designations do not have cross-hatching. The cycle of operation as indicated in Figure 3A is initiated by a first signal pulse (if one occurs) and lasts through the $A_2$ pulse following the second signal pulse. For the moment it will be assumed that signal pulses occur regularly. Hereinbelow there will be an examination of cases where signal pulses may be absent.

The occurrence of the first signal pulse in winding 60 will shift core III to its 1 or set state. No other core will be affected (the back-to-back uni-directional conducting devices 74 and 76 prevent any loop current through windings 14 and 16). The remanent states of the cores are now core III in its 1 state, and cores I and II in their 0 states. When an $A_1$ advance pulse is applied at terminals 62 and 64, the resulting current passing through winding 66 will shift core III back to its 0 state. During this shifting phase, the back E. M. F. or impedance at winding 70 will divert sufficient current through windings 14 and 16 to shift core II. Core I will not shift because winding 14 may have fewer turns, for example, to prevent shifting of core I. The signal coupling circuit for the just described step is shown separately in Figure 3B, wherein the windings are lettered to correspond to those in Figure 3. The voltage across winding 70 has a relatively high value because core III is shifting. A relatively great number of turns may be included in winding 70, to insure a high impedance or back E. M. F. while core III is shifting. In any event, a relatively great current is diverted to the circuit branch including windings 14 and 16. However this circuit branch presents relatively high impedances at both cores I and II because the current is tending to shift both cores. The result is that the M. M. F. at winding 14 is insufficient to shift core I. In winding 16 the M. M. F. should be able to shift core II. However core II may or may not be completely shifted at this time depending mainly on the number of turns in windings 70 and 16, respectively. If the number of turns in winding 70 is sufficiently greater than the number of turns in winding 16, core II will shift completely; if not, it will not shift completely at this time. It is not necessary that core II shift completely on the first $A_1$ pulse following a signal input pulse; core II can shift most of the way on this first $A_1$ pulse and the remainder of the way at the beginning of the second $A_1$ pulse, leaving the remainder of the second $A_1$ pulse from core III to shift core I. Core I may shift more rapidly than core II because there are fewer turns in winding 14 than in winding 16. For the sake of simplicity, it will be assumed that the first $A_1$ pulse shifts core II completely into its 1 state. If so, at the end of of the step, core III has been cleared, core II is in its 1 or set state, and core I remains in its cleared or 0 state.

On the next step of the cycle, when the $A_2$ pulse occurs it finds core I already in its 0 state and therefore core I remains unchanged. At this time only a small back E. M. F. is generated in winding 26 on core I and therefore only a very small current pulse is diverted to flow through winding 30. Accordingly, core II is not changed back to its 0 state. The resistor 110 may be included, mainly where the diodes 82 and 84 may have equal forward conduction characteristics, to prevent unwanted current in winding 30 when core II is not to shift. It may be mentioned here that resistor 112 may be included in the circuit with windings 14 and 16 to similarly prevent unwanted current when core III is not shifting. Obviously the resistors in one or both cases may be eliminated if the diode 84 is at higher forward impedance than diode 82, and similarly for diodes 76 and 74. At the time of this $A_2$ pulse, core III is not affected. Accordingly the following remanent states prevail: core I is in its 0 state, core II is in its 1 state, and core III remains in its 0 state. It will be noted that the $A_2$ pulse at this time has had no effect on the circuit, and could be dispensed with.

The next occurring signal pulse at terminals 10, 12 drives core III to its 1 state, without affecting cores I or II, leaving core III in its 1 state, core II in its 1 state and core I in its 0 state.

In the next step of the cycle, core III is driven to its 0 state by the next $A_1$ pulse. The signal coupling circuits can now be analyzed with reference to Figure 3C. Now the back E. M. F. generated in winding 16 is smaller than in the preceding case because core II is already shifted and is driven only from positive remanence to positive saturation. The back voltage generated across winding 14 is considerably larger and is as in the first case, because it remains for core I to be driven from its 0 state to its 1 state. However the reduction in the impedance at winding 16 permits sufficient current to pass through winding 14 to now shift core I. In other words, the sum of the impedances at windings 14 and 16 is less than in the preceding step of the cycle. Thus the current flowing through windings 14 and 16 is larger than in the preceding step, with the result that the M. M. F. driving core I is strong enough to shift its condition to the 1 state. Core II remains at its 1 state. Therefore, core III is in its 0 state, cores I and II are in their 1 states.

The next step of the cycle is the application of an $A_2$ pulse. This advance current at winding 36 shifts core I back to its 0 state. Accordingly a large back E. M. F. is generated at winding 26. This diverts sufficient current through winding 30 to drive core II back to its 0 state. Core III remains at its 0 state. The advance pulse $A_2$ drives core II back to its 0 state in this step with sufficient force to enable core I to drive the following stage (not shown), due to back E. M. F. being generated in winding 92. Advantage is taken here of the amplifying properties of the cores, as will be understood. It should be noted however that the output can be in series with the winding 30, as shown in Figures 1 and 2 hereinabove. In any event, the cores in stage I of Figure 3 are now all cleared to their 0 states, and an output pulse has been generated.

In the immediately preceding analysis of the circuit of Figure 3, it has been assumed that input signal pulses occur regularly twice each cycle. Actually an input signal may or may not be present. However the circuit of Figure 3, in common with the circuits of Figures 1 and 2, can tolerate the continuous repetition of advance pulses, in this case either the $A_1$ and/or $A_2$ advance pulses, without affecting the circuit. If no input pulse occurs at the beginning of a cycle, no other of the cores will be changed to a 1 state from its 0 state. The reason is that core III must be storing a 1 before the $A_1$ pulse can change core II from 0 to 1. The $A_2$ pulse is similarly inoperative. No counting will occur therefore until an initial signal pulse is received. As another possibility, an input signal pulse may occur at the beginning of the cycle, but not after the second step. In this case, with cores III and I storing a 0, and core II storing a 1, the next $A_1$ pulse finds core III still at 0, hence no change in cores I and II will result. Thus, again the operation of the counter will be idle during the occurrence of successive advance pulses until a signal pulse is received.

Figure 4:
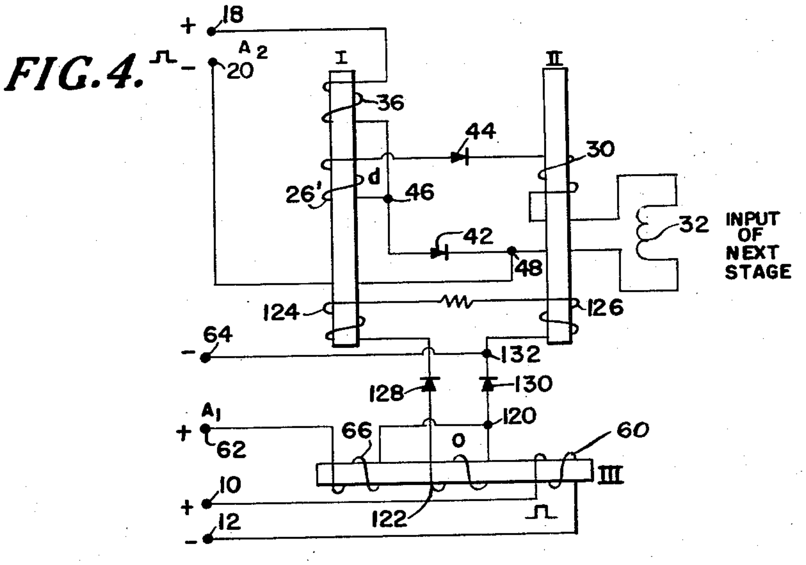
Figure 4 shows a still further embodiment of the counting unit of the invention and component circuits therefor.

Figure 4 shows a counter circuit using three cores I, II and III as a binary counter unit or stage with core III again providing suitable impedance and signal strength. However, the circuit arrangement in the embodiment of Figure 4 utilizes the basic principle of Figure 2 as distinguished from Figure 1. That is, the $A_2$ advance pulses are applied to terminals 18, 20 and the advance current first flows through winding 36 and then to junction 46 where the circuit divides into two transfer branches, one of which includes winding 26' on core I, a uni-directional conducting device 44, winding 30 on core II and winding 32 in the input of the next stage. The other transfer circuit branch includes uni-directional conducting device 42. The transfer circuit branches recombine at junction 48 and a return to the advance terminal 20 is provided. Thus far the circuit of Figure 4 is according to the circuit of Figure 2. However, Figure 4 additionally shows the principle of the circuit of Figure 2 applied with regard to the relationship between cores I and II and core III. The signal input is to be applied to terminals 10 and 12 between which is connected the input winding 60 on core III (an analogy may be drawn to the windings on core III in the Figure 3 embodiment). The $A_1$ advance pulses are applied between terminals 62 and 64. This circuit includes advance winding 66 on core III and the junction 120 whereat the circuit divides between two transfer circuit branches, one including the winding 122 on core III, winding 124 on core I and winding 126 on core II. The first circuit branch also includes uni-directional conducting device 128. The other circuit branch includes only the uni-directional conducting device 130. The circuit branches recombine at junction 132 and return to $A_1$ advance terminal 64.

In operation the embodiment of Figure 4 may also be analyzed by use of Figure 3D, the major distinction from Figure 3 being that in the case of winding 26' in Figure 4 the E. M. F. here generated when core I is shifting, aids current flow through winding 30 in sufficient amount to shift core II to its 0 state, and to produce an output current in winding 32. Similarly, when core III is shifting, the E. M. F. generated in winding 122 aids in forcing current through windings 124 and 126, in the first case to shift core II but not core I, and in the other case, to shift core I, if core II has been shifted.

The manner of operation of the embodiments of Figure 1 and Figure 3 may be conveniently termed the "opposing E. M. F." case. That is, current is diverted through the winding 30 on core II when an opposing E. M. F. is generated in winding 26, and sufficient current is forced through windings 14 and 16 when an opposing E. M. F. is generated in winding 70. On the other hand, in the arrangement of Figures 2 and 4, the operation may be said to be based on an "aiding E. M. F." That is, in winding 26' and 122 in Figure 4, in winding 26' in Figure 2, sufficient current flows through winding 30 to shift core II when core I is shifting and the E. M. F. generated in windings 26' and 122 aids in forcing said current through the respective windings 30 and 124, 126.

Figure 5 is included to emphasize the function of the back-to-back uni-directional conducting devices so that a setting or resetting operation on either one of the cores involved, will not affect the other core. Here a circuit as in Figure 2 is again illustrated toward the top of cores I and II. Toward the bottom of core I is a first exemplary core setting winding 150 and a core resetting winding 152. At the bottom of core II is illustrated a core setting winding 154 and a core resetting winding 156. It should be noted that no matter which of coils 150, 152 is pulsed any E. M. F. which may be generated in winding 26' due to changing flux condition in core I cannot affect core II. This is because no matter in which direction the E. M. F. at winding 26' may tend to drive current, it meets the high resistance of one or the other of the uni-directional conducting devices 42 and 44, which are back-to-back in the circuit loop. Similarly, no matter which of windings 154 or 156 on core II is pulsed, E. M. F. generated in winding 30 cannot produce any loop currents through winding 26' on core I. At the same time, whenever an advance pulse is applied between terminals 18 and 20 the transfer qualities of the circuit accrue notwithstanding the back-to-back arrangement of the uni-directional conducting devices.

Figure 6:
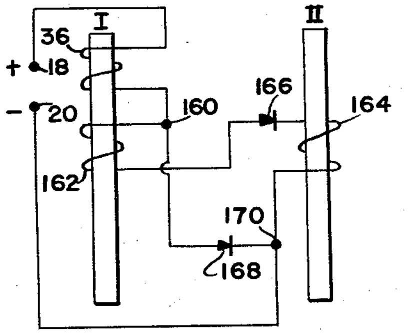
Figure 6 shows a further embodiment of transfer circuits according to the invention.

Figure 6 shows yet another embodiment of the basic transfer circuit wherein both transfer circuit windings are in the same branch or section but an opposing E. M. F. principle is employed. In this case the advance pulse applied between terminals 18 and 20 results in a current through advance winding 36 capable of shifting core I. Here the circuit divides at junction 160, and one transfer branch includes winding 162 on core I and winding 164 on core II. This circuit branch also includes a uni-directional conducting device 166. The other circuit branch includes uni-directional conducting device 168. The branches recombine at junction 170. In operation, when core I is not shifting due to an advance current, little back E. M. F. is generated in winding 162 and a majority of the current flows through windings 162 and 164 to shift core II. When core I is shifting, the back E. M. F. generated in winding 162 is considerable, the majority of the current flows through uni-directional conducting device 168, and there is insufficient current in winding 164 to shift core II. In this case of course the device 168 or other parts of the circuit branch in which it is located, should have sufficient forward impedance to drive shifting current through windings 160 and 164 whenever core I is not shifting.

Figure 7:
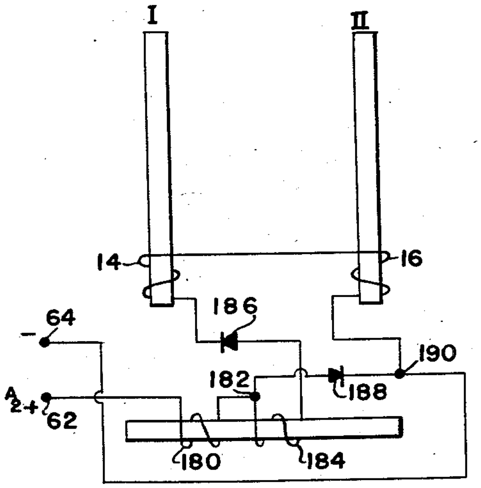
Figure 7 shows a further embodiment of transfer circuits among three cores according to the invention.

The basic circuit principle of the Figure 6 embodiment may also be used in a three-core arrangement as in Figure 7, as follows: an $A_2$ advance pulse across terminals 62 and 64 may drive a current through advance winding 180 on core III to a junction 182 whereat the circuit divides into two transfer branches. The first branch may include winding 184 on core III, uni-directional conducting device 186, winding 14 on core I and winding 16 on core II. The other circuit branch may include unidirectional conducting device 188, the circuit branches recombining at junction 190 and from there the circuit is returned to terminal 64. In this case, when core III is not shifting, the low back E. M. F. in winding 184 will permit current to be diverted through windings 14 and 16 in sufficient strength to shift one or the other of cores I and II. When core III is shifting, the back E. M. F. in winding 184 will be considerable and insufficient current will pass through windings 14 and 16. Meanwhile the back-to-back arrangement of unidirectional conducting devices 186 and 188 prevents any operation upon cores I and/or II by windings (not shown) from affecting core III via winding 184.

In the foregoing explanations, the advance windings, for example winding 36 in Figure 5, have been connected in series with the transfer circuits, for example the transfer circuit between junctions 46 and 48 in Figure 5, across the main advance pulse circuit. Such connection most readily satisfies the requirement that a voltage be across the advance windings coexistent in time with voltage across the transfer windings. However, it will be apparent that the respective circuits could be across separate sources, and no limitation is intended.

Figures 8, 9, 10, 11:
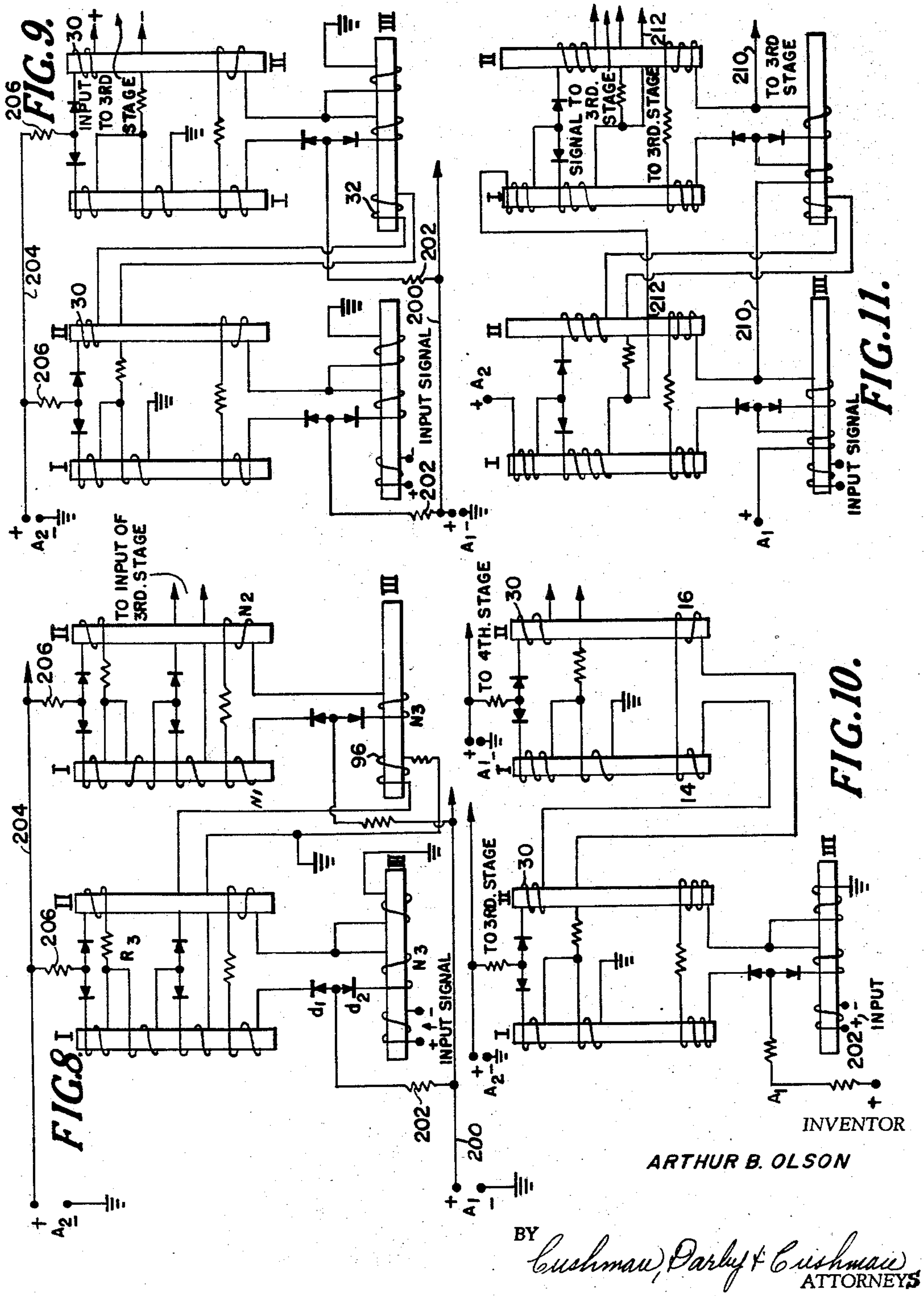
Figure 8 shows one technique for interconnecting counter units according to the invention.
Figure 9 shows a still further technique for interconnecting counter units according to the invention.
Figure 10 shows an additional technique for interconnecting counter units according to the invention.
Figure 11 shows yet another technique for interconnecting counter units according to the invention.

Thus far the description has proceeded with regard to individual binary counter units. The matter of interconnecting or cascading units to form counter chains will now be described. In Figure 8 the cascading of individual units in accordance with Figure 3 is set forth. In this case the output winding 96 of the first stage is to be found on core III of the second stage. The circuit for the $A_1$ advance pulses is connected in parallel to the advance and transfer circuits operative between core III and cores I and II in each stage. The connection from the $A_1$ advance bus 200 to each stage is preferably through a fairly high value resistor 202. The $A_2$ advance pulses similarly drive each stage in parallel, the transfer circuitry between cores I and II in each stage being connected in common to an advance bus 204. Again these connections are preferably through resistors 206 of relatively high resistance. The use of core III in each step insures proper impedance and signal strength for driving that stage.

The arrangement in Figure 9 is the same as in Figure 8, except that in this case the output winding, winding 32 on core III of each higher stage, is connected directly in series with the winding 30 on core II of the preceding stage, in the manner first mentioned hereinabove in connection with Figure 2.

In Figure 10 the manner of cascading is basically as in Figures 8 or 9, except that core III is employed only in the first stage and thereafter cores I and II of higher stages have windings 14 and 16 thereof driven directly from the preceding stage but being in series with the winding 30 on core II of each preceding stage. This manner of cascading also makes possible the use of $A_2$ pulses for advancing the odd numbered stages beginning with the first, the use of the $A_1$ pulses for advancing the even numbered stages.

Figure 11 illustrates a suitable method of cascading counter stages for a small number of stages. Here a simple series connection of advance windings is employed. This is, the $A_1$ pulses are pulses which flow through the entire transfer circuitry between cores III and I and II of the first stage, then are applied over line 210 to the next higher stage, etc. Similarly, the $A_2$ pulses flow through the entire transfer circuitry between cores I and II of the first stage and then flow through line 212 and through the transfer circuitry between cores I and II of the next higher stage, etc.

The foregoing detailed description has been given only for purposes of illustration and the scope of the invention is to be determined from the appended claims.

What is claimed is:

1. In a magnetic core circuit, first and second cores, a circuit including a winding on the first core and a winding on the second core, means for applying a voltage of predetermined amplitude across said circuit, and wherein the winding on the first core has a greater number of turns than the winding on the other core, and the windings are connected in series in the circuit, whereby with both cores initially in such state as to be shiftable into a new remanence state by current through the circuit, the impedance offered to the circuit by both windings will restrict the amount of current flowing to such amount that only the core having the windings of the greater number of turns will be shifted, but when the first mentioned core has shifted the reduced impedance presented to the circuit will increase the current whereby the other core shifts notwithstanding the lesser number of turns of the winding thereon.

2. A circuit as in claim 1 wherein the means for applying a voltage of predetermined amplitude across said circuit includes means for applying same in repetitive pulses.

3. In a magnetic core circuit, first and second cores, a circuit including a winding on the first core and a winding on the second core, means for applying a voltage of predetermined amplitude across said circuit, the coupling of the windings to the respective cores being such that current flowing in the circuit due to said voltage will generate sufficient M. M. F. at one core to be able to shift same into an opposite state of remanence, and subsequent current flow in the circuit due to said voltage will be able to shift the other core, the windings being connected in series in said circuit, the circuit being a loop having uni-directional conducting devices arranged back-to-back therein, and the means for applying a voltage of predetermined amplitude across the circuit including one junction point in the circuit between said uni-directional conducting devices.

4. A magnetic core circuit comprising first and second cores, a transfer current path having two sections, a first transfer winding on the first core connected in one of said sections, a second transfer winding on the second core connected in said section, means for applying a voltage across said transfer current path to cause current flow therein, means including an advance winding on the first core for carrying an advance current coexistent in time with the first mentioned current, the arrangement being such that advance current in said advance winding in amount sufficient to but in a direction against shift of the first core will induce but a relatively low voltage in the first transfer winding, and advance current in amount sufficient to and in a direction to shift the first core will cause a relatively great E. M. F. to be induced in the first transfer winding, the second transfer winding being connected in one of the transfer current path sections so that under one condition of E. M. F. generated in the first transfer winding a sufficient current will flow in the second transfer winding to shift the second core if shiftable, and under the other condition of E. M. F. generated in the first transfer winding an insufficient current will flow in the second transfer winding to shift the second core even if shiftable.

5. A circuit as in claim 4 wherein the advance winding is connected in series with the transfer current path beyond the sections thereof and said voltage is applied across the advance winding and transfer path in series.

6. A circuit as in claim 4 wherein the first and second transfer windings are both connected in series in the same section of the transfer current path.

7. A circuit as in claim 6 wherein the polarity of the first and second transfer windings with respect to one another is such that the relatively great E. M. F. generated in the first transfer winding when the first core shifts aids in driving sufficient current through the second transfer winding to shift the other core.

8. A circuit as in claim 6 wherein the interconnection of the transfer windings is such that the relatively great E. M. F. generated in the first transfer winding when the first core shifts opposes current flow through the second transfer winding and prevents shift of the other core.

9. A circuit as in claim 4 wherein the interconnection between the first and second transfer windings includes two uni-directional conducting devices arranged back-to-back, and wherein the means for applying a voltage drop across said path includes at least one junction point between said uni-directional conducting devices, the arrangement being such that voltages generated in either transfer winding due to changing flux conditions on either core apart from the time of application of said voltage will be unable to affect the other core due to suppression of current in either direction by the back-to-back uni-directional conducting devices.

10. A circuit as in claim 4 wherein the first and second transfer windings are both connected in series in the same section of the transfer current path, wherein this section of the transfer current path includes a uni-directional conducting device, and wherein the other section of the transfer current path includes a uni-directional conducting device, said uni-directional conducting devices being arranged back-to-back with respect to the series circuit including same and the transfer windings.

11. In a magnetic core circuit, first and second magnetic cores, a signal circuit, a transfer circuit, an advance circuit, the signal circuit having a first winding on the first core and a second winding on the second core, the transfer circuit having a first winding on the first core and a second winding on the second core, the advance circuit having a winding on the first core, the second signal winding on the second core being differently coupled to the second core than the first signal winding is to the first core whereby under a given condition of current flow in the signal circuit a greater M. M. F. is directed to the second core than the first core, the arrangement being such that current flowing in the signal circuit in response to application of voltage of predetermined amplitude across the circuit will shift first the second core, and then the first core when the impedance offered to the circuit by the cores is reduced by completion of shifting of the second core, and current flowing through the advance winding following shift of the first core and coexistent in time with the voltage across the transfer circuit will reshift the first control and in so doing generate an E. M. F. in the first transfer winding to cause sufficient current to flow in the second transfer winding to reshift the second core.

12. A circuit as in claim 11 wherein the first and second signal windings are in series and the first signal winding has lesser turns than the second signal winding whereby in response to signal voltages of magnitude within predetermined limits the second core will shift, whereupon current will increase sufficient to shift the first core.

13. A circuit as in claim 12 and including means for applying the voltage across the transfer circuit in the form of repetitive pulses.

14. A circuit as in claim 11 wherein the tranfer circuit is connected in series with the advance winding and the voltage of predetermined amplitude is applied across the transfer circuit and advance winding in series.

15. A circuit as in claim 11 wherein the first transfer winding has a greater number of turns than the second transfer winding.

16. A circuit as in claim 11 wherein the transfer circuit is divided into two sections and wherein the first transfer winding is in one section and the second transfer winding is in the other section.

17. A circuit as in claim 16 wherein each transfer circuit branch includes a uni-directional conducting device, the devices being connected back-to-back with respect to the series circuit loop including the respective transfer windings.

18. A circuit as in claim 11 wherein the transfer circuit is divided into two sections, and the advance circuit is connected in series with the transfer circuit beyond the sections thereof.

19. A circuit as in claim 11 wherein the transfer circuit is divided into two sections, and wherein the first and second transfer windings are both in one circuit section.

20. A circuit as in claim 19 wherein the first transfer winding is so arranged that while the first core is shifting due to current in the advance circuit the E. M. F. generated in the first transfer winding aids in causing current flow through the second transfer winding.

21. A circuit as in claim 11 wherein the transfer circuit includes two uni-directional conducting devices connected back-to-back with respect to a loop circuit which includes said transfer windings.

22. A circuit as in claim 11 wherein the signal circuit includes two uni-directional conducting devices connected back-to-back with respect to a loop circuit including said signal windings.

23. A circuit as in claim 11 including means for applying signal voltage pulses across the signal circuit at predetermined times, and for applying coexistent voltage pulses across the advance and transfer circuits at least once after every two signal voltage pulses, the arrangement being such that with the cores initially being in a first state of remanence, the second core will be shifted by the first signal pulse, the second core will remain shifted and the first core will be shifted during the second signal pulse, and the first pulse across the advance and transfer circuits following the second signal pulse will cause reversion of both cores.

24. A circuit as in claim 23 and including means for producing an output pulse coincidentally with said reversion of the second core.

25. A circuit as in claim 24 wherein the means for generating an output includes means in series with the second transfer winding.

26. A circuit as in claim 24 wherein the means for generating an output pulse includes means connected to the transfer circuit and having an additional winding on the first core.

27. A binary counting circuit including three magnetic cores; a first transfer circuit including a winding on the first core and a winding on the second core, a first advance circuit including a winding on the first core, a second transfer circuit including a first winding on the third core, a second winding on the first core and a third winding on the second core, a second advance circuit including a winding on the third core, a signal input circuit including a winding on the third core, the winding of the second transfer circuit on the second core being coupled to the second core to produce greater E. M. F. for given current than the transfer winding of the second transfer circuit on the first core, the first transfer circuit arranged so that while the first core is shifting sufficient current is diverted through the transfer winding on the second core to shift the second core if shiftable, the second transfer circuit being ararnged so that when the third core is shifting, sufficient current is diverted through the transfer windings of the second transfer circuit on the first and second cores to shift one or the other of said cores as aforesaid, means for applying signal pulses to the signal winding on the third core at spaced times, means for applying a first set of advance pulses to the first advance and transfer circuits at spaced apart times which are interleaved with the times of the signal pulses and occur at a rate of at least one advance pulse after every two signal pulses, and means for applying a second set of advance pulses to the second advance and transfer circuits at times spaced apart with respect to the times of the signal pulses and the advance pulses of said first set, said second advance pulses following each signal pulse, the arrangement being such that a first signal pulse will shift the third core, whereupon a second advance pulse will reshift the third core and in so doing will cause the flow of current through the second transfer circuit to shift the second core but not the first, a second signal pulse will again shift the third core, and a subsequent advance pulse across the second transfer and advance circuits will reshift the third core and now shift the first core, leaving the second core in its shifted condition, whereby an advance pulse through the first advance and transfer circuits will reshift the first and second cores.

28. A circuit as in claim 27 wherein the first transfer circuit includes two uni-directional conducting devices arranged back-to-back in the loop circuit including the first and second transfer windings of said first transfer circuit.

29. A circuit as in claim 27 wherein the second transfer circuit includes two uni-directional conducting devices arranged back-to-back in the loop circuit including the first, second and third windings of said second transfer circuit.

30. In a magnetic core counting circuit, a plurality of counter circuit units, each unit including, first and second magnetic cores, a signal input circuit, a transfer circuit, an advance circuit, the signal circuit having a first winding on the first core and a second winding on the second core, the transfer circuit having a first winding on the first core and a second winding on the second core, the advance circuit having a winding on the first core, means connected across the signal input circuit of the first counter unit for applying voltage pulses of predetermined amplitudes at spaced apart times, means connected across the advance and transfer windings of at least the first counter unit for applying thereacross voltage pulses of predetermined magnitude at time occurrences following at least every second signal input pulse, the arrangement being such that in said first unit current flowing in the signal input circuit in response to the application of said voltage pulses will shift first the second core thereof and then the first core after the application of the second signal input pulse, and current through the advance and transfer circuits following said shift of the first core will reshift the first core and in so doing generate an E. M. F. in the first transfer winding to cause sufficient current flow in the second transfer winding to reshift the second core, means coupled to each counter unit responsive to the condition of said reshifting of the second core for generating an output signal, the signal input means for the next higher unit of the counter being connected with said output generation means of the preceding unit, and means for applying voltage pulses across the advance and transfer circuits of the respectively higher counter units at least following the application to the respective unit of at least two signal input pulses from the preceding counter unit.

31. A circuit as in claim 30 and including means for applying said pulses across said advance and transfer windings in parallel.

32. A circuit as in claim 30 wherein at least the first unit of the counter includes a third core, a primary signal input winding on said third core, a second transfer circuit having a first winding on the third core, a second advance circuit having a winding on the third core, said signal input circuit having said first signal winding on the first core and the second signal winding on the second core connected to said second transfer circuit, and means for applying a second series of voltage pulses of predetermined magnitude across said second transfer and second advance circuits at times interleaved with signals applied to said primary input signal winding and further interleaved with time occurrences of pulses applied across said first transfer and first advance circuits.

33. A circuit as in claim 32 wherein each successive unit of the counter includes a third core and second transfer and advance circuits, and wherein means are provided for applying pulses across said second transfer and advance circuits in parallel.

34. A circuit as in claim 33 and including means for connecting the second transfer and advance circuits of each unit in series across said means for applying voltage pulses.

35. A circuit as in claim 30 wherein the means for applying pulses across the transfer and advance windings of each unit includes means for interconnecting the advance and transfer windings of each unit in series for driving same in series.

36. In a magnetic core circuit, at least two cores, a transfer circuit having two junction points and at least two circuit sections in parallel with respect to one another between said junction points, the sections being connected with respect to each other in series to form a transfer loop, at least one winding on one core and connected in one of said sections and at least one winding on the other core and connected in said one of said sections, the arrangement being such that voltage applied across the transfer circuit may transfer information stored in one of said cores to the other of said cores in dependency upon the initial state of the core from which said information is to be transferred.

37. A circuit as in claim 36 wherein the loop includes two uni-directional conducting devices connected in opposition to prevent non-transfer operations upon either core from influencing the other core, while currents in the transfer circuit may shift information as aforesaid.

References Cited in the file of this patent

UNITED STATES PATENTS

| | | |
|---|---|---|
| 2,640,164 | Geil, Jr. et al. | May 26, 1953 |
| 2,691,152 | Stuart-Williams | Oct. 5, 1954 |
| 2,696,347 | Lo | Dec. 27, 1954 |
| 2,708,722 | Wang | May 17, 1955 |

Notice of Adverse Decision in Interference

In Interference No. 90,577 involving Patent No. 2,859,359, A. B. Olson, Magnetic binary counting circuit, final judgment adverse to the patentee was rendered Apr. 26, 1962, as to claims 1 and 2.

[*Official Gazette June 12, 1962.*]